UNITED STATES PATENT OFFICE.

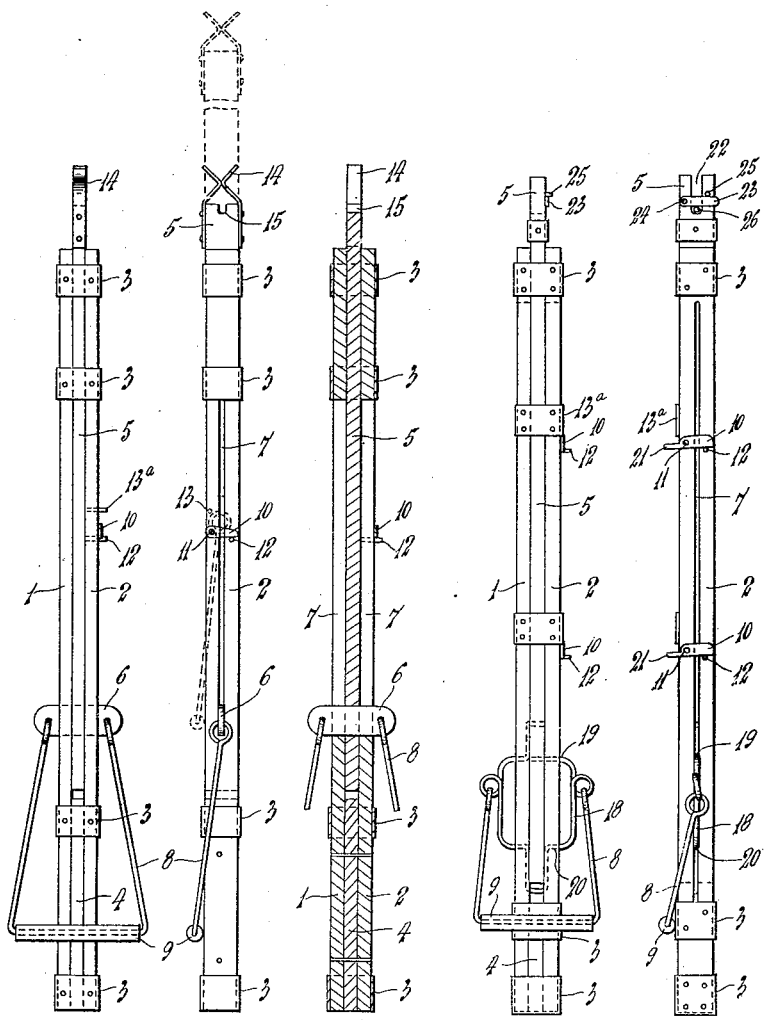

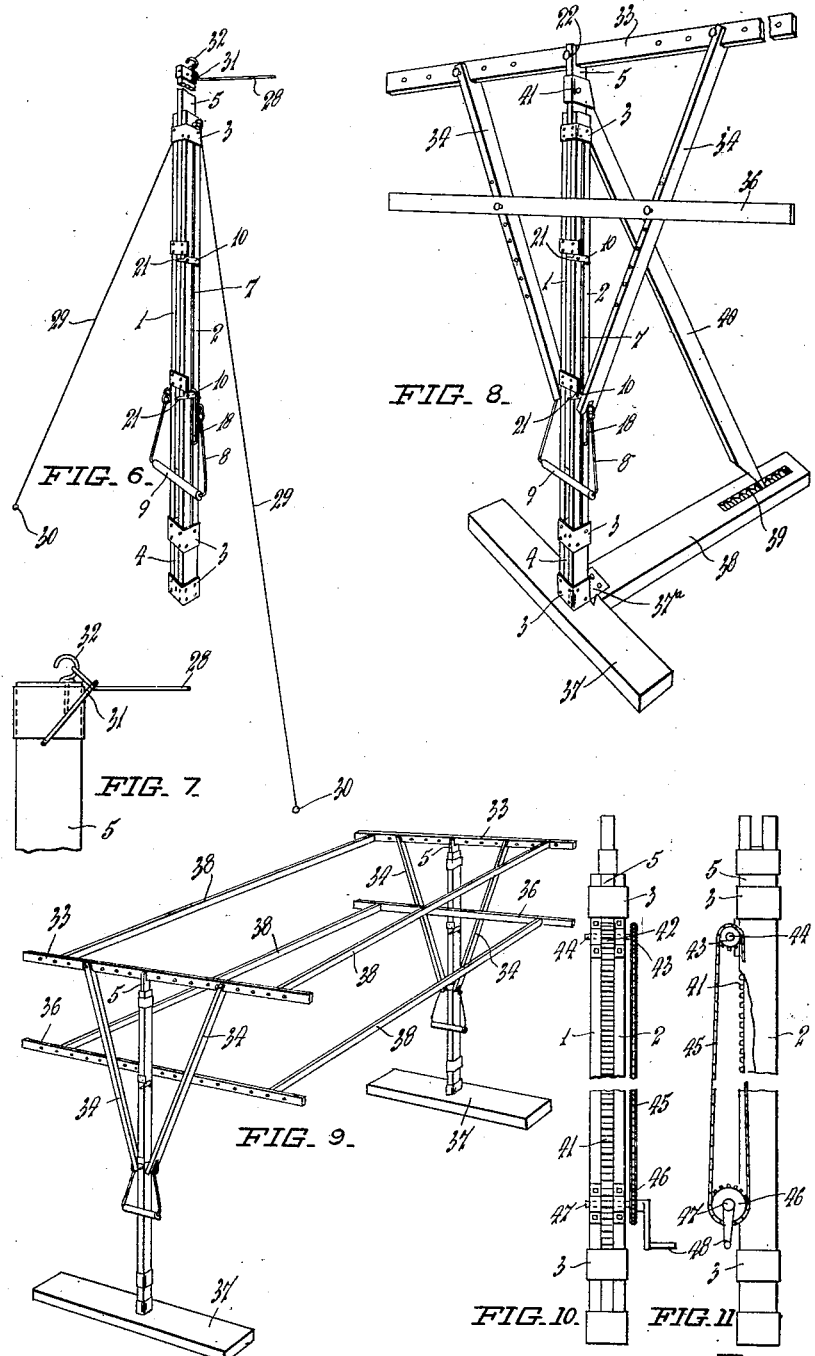

CHARLES EDWARD EASTERBROOK SMITH, OF AUCKLAND, NEW ZEALAND.

EXTENSIBLE SUPPORT.

1,293,222.   Specification of Letters Patent.   Patented Feb. 4, 1919.

Application filed November 13, 1916. Serial No. 131,183.

*To all whom it may concern:*

Be it known that I, CHARLES EDWARD EASTERBROOK SMITH, a citizen of the Dominion of New Zealand, and residing at Monte le Grande Road, Auckland, in the Provincial District of Auckland, in the Dominion of New Zealand, contractor and builder, have invented certain new and useful Improved Extensible Supports, of which the following is a specification.

This invention provides a support or prop which may be used for numerous purposes.

In its simplest form the invention comprises members slidable upon one another and has side members fastened together with a space between them wherein a central member is slidable. A crosshead fixed to the central member extends through slots formed in the side members, and a handle for operating the central member is attached to the crosshead. A catch or catches is or are provided so that when the central member is pushed upward, the crosshead raises a catch which falls after the crosshead has passed and prevents the central member from descending until desired.

Additional cross members supported by struts are provided for extending the uses to which the support may be put, as for example, for supporting the branches of fruit trees, for supporting a tent, for carrying a blackboard or easel, for supporting the decking of a bridge, and for like uses.

The drawing herewith illustrates the invention and will now be referred to for the purposes of a detailed description.

Figure 1, is a front elevation,

Fig. 2, a side elevation, and

Fig. 3, a sectional elevation of the support in its simplest form,

Fig. 4, is a front elevation, and

Fig. 5 a side elevation of the support with a double lift crosshead,

Fig. 6, is a perspective view of the support as used to sustain an overhead rope or the like, Fig. 7, is a side elevation of a detail on a larger scale, Fig. 8, is a perspective view of the support as used for supporting branches of trees or decking of a bridge, or for carrying a blackboard or an easel or the like, Fig. 9, is a perspective view of the support as used in a cradle form for sustaining a plurality of branches of a tree, Fig. 10, is a front elevation, and Fig. 11, a side elevation of the support provided with gearing for raising and lowering the central member.

Referring more particularly to Figs. 1, 2, and 3, the side members 1 and 2 are connected together by ferrules or straps 3, and are spaced apart by a packing piece 4 for the purpose of admitting a central member 5, which is slidable longitudinally between the members 1 and 2 and in the ferrule or strap 3 at the top of the said members.

A crosshead 6, consisting of a flat plate, passes through the central member 5 and extends through slots 7 made in the side members 1 and 2. A handle is attached to the crosshead 6 and consists of a shackle 8 fitted with a hand piece 9.

A catch 10, consisting of a flat plate, is pivoted by a pin 11 to the side member 2 and is adapted to fall by gravity and rest upon a pin 12 upon the other side of the slot and projecting from the said member. A stop pin 13 prevents the catch from being turned so far over that it will not fall down by gravity as described. The drawing shows a single catch, but there may be a plurality of superposed catches for sustaining the crosshead at any desired height.

The top of the member 5 is fitted with spring arms 14 adapted to receive and retain a rope, clothes line or the like, or a gap 15 may be used instead of, or with, the said spring arm.

In use the rope, clothes line or the like is passed between the spring arms and into the gap 15, when the member 5 is in its lowered position as shown in Figs. 1, 2 and 3; and the member 5 is then raised by means of the handle, until the crosshead 6 passes beyond the catch 10 which then falls down by gravity and forms a barrier across the slot 7 whereon the crosshead may rest and prevent the descent of the said central member until the catch is again raised by hand.

Figs. 4 and 5 show a construction closely resembling the construction shown in Figs. 1, 2, and 3. The crosshead 18, however, is made of bar iron or strong wire and in the form of a loop, having horizontal members 19 and 20 either of which may be engaged by the catch 10. This construction thus provides a double lift crosshead.

The catch 10 is provided with a tailpiece 21 for the purpose of facilitating the manipulation of the said catch.

The central member 5 is provided at the top with a deep gap 22 upon one side of which a flat spring 23 is pivoted on a pin 24. A pin 25 projecting from the member 5 is adapted to prevent the spring from being raised. When the rope or line 26 is to be removed from the gap 22, the spring 23 is sprung over the pin 25 and turned upward on its pivot pin 24.

The form of the support shown in Figs. 1, 2, 3, 4 and 5 is adapted for use in sustaining in an elevated position a rope, a clothes line or the like, or to be used as a tent pole for a bell tent or wherever a single pole is required as a support.

Referring to Fig. 6, the support is adapted for use as a post for sustaining a rope 28. Two such supports are used together and the rope 28 is stretched between them, the strain being taken by guy ropes 29 fixed at one end to the tops of the members 1 and 2 and at their other ends to pegs 30 driven into the ground. The ends of the rope are formed into loops which are passed through shackles 31, pivoted to the member 5, and engaged by hooks 32 fixed to the members 5 at a higher level than the shackles. Kinks are thus made in the rope, which then has no tendency to leave the hooks 32, when the rope is swayed by the wind or otherwise.

Fig. 8 shows a crossbar 33 attached centrally to the top of the member 5, and further supported by struts 34 resting on the crossbar 18.

The ridge of a rectangular tent, the branches of a tree, the decking of a bridge or the like may be supported on the crossbar 33. Another crossbar 36 or other similar crossbars may be fixed to the struts 34, so that upper branches may be supported on the crossbar 33, and lower branches on the crossbar 36. The crossbars 33 and 36 may be parallel to each other, or divergent as shown in the drawing.

The base 37 may be employed and may have a rearward extension 38 fitted with a rack 39. A back strut 40 pivoted by a pin 41 to the member 5 is adapted to be engaged at its bottom end by the rack 39. The side members 1 and 2 are connected to the base 37 by a hinge 37ª. A blackboard or framed canvas or the like may rest upon the crossbar 36 and against the crossbar 33, while the angle of the blackboard or canvas may be altered as desired by adjusting the strut 40 in the rack 39. The raising and lowering of the blackboard or the like is readily effected by raising or lowering the central member 5.

Fig. 9 shows two supports with crossbars 33 and 36 and longitudinal bars 38 resting on the said crossbars. A cradle is thus formed for supporting upper and lower branches on all four sides of a tree.

Figs. 10 and 11 show means for raising and lowering the central member 5 when the support is massive in construction. The handle is replaced by a rack 41 and a pinion 42 gearing therewith. The pinion is driven by a sprocket wheel 43 fixed to the shaft 44 of the pinion 42, and by a sprocket chain 45 and a sprocket wheel 46, upon the shaft 47 to which is fixed a crank handle 48. The member 5 is raised and lowered by operating the handle 48.

What I do claim and desire to secure by Letters Patent of the United States is:—

1. A support for the purpose described, comprising a central member slidable between side members, a crosshead attached to the central member and extending through slots in the side members, a handle attached to the crosshead, catches for supporting the crosshead, a pivoted flat spring extending across a slot made in the top of the central member, and a pin projecting from the said central member adapted to engage the spring, substantially as set forth.

2. A pair of supports for the purpose described, each support comprising a central member slidable between side members, a crosshead attached to the central member and extending through slots in the side members, a handle attached to the crosshead, catches adapted to form rests for the crosshead, a base whereon the support rests, a crossbar at the top of the central member, struts supporting the crossbar from the crosshead, a second crossbar fixed to the struts, and longitudinal bars resting on the crossbars, substantially as set forth.

3. A support for the purpose described, comprising a central member slidable between side members, a double lift crosshead attached to the central member and extending through slots in the side members, a handle attached to the crosshead, catches adapted to engage the upper or lower part of the crosshead, the crosshead being of such structure that the catch engages at one point outside of the periphery of the crosshead and at the other point within the periphery of the crosshead, substantially as described.

4. A support for the purpose described, comprising a central member slidable between side members, a double lift crosshead formed of a single piece of bent wire attached to the central member and extending through slots in the side members, a handle attached to the crosshead, catches adapted to engage the upper or lower part of the crosshead, substantially as described.

In testimony whereof I have signed my name to this specification in the presence of two witnesses.

CHARLES EDWARD EASTERBROOK SMITH.

Witnesses:
E. S. BALDWIN,
JAMES ANDERSON HARDIE.